(12) United States Patent
Seo et al.

(10) Patent No.: US 11,962,538 B2
(45) Date of Patent: *Apr. 16, 2024

(54) METHOD AND DEVICE FOR RECEIVING SIGNAL IN WIRELESS COMMUNICATION SYSTEM

(71) Applicant: LG Electronics Inc., Seoul (KR)

(72) Inventors: Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,301

(22) Filed: Dec. 21, 2022

(65) Prior Publication Data

US 2023/0155786 A1 May 18, 2023

Related U.S. Application Data

(63) Continuation of application No. 17/410,935, filed on Aug. 24, 2021, now Pat. No. 11,569,963, which is a
(Continued)

(51) Int. Cl.
 *H04L 5/00* (2006.01)
 *H04L 1/00* (2006.01)
 (Continued)

(52) U.S. Cl.
 CPC .......... *H04L 5/0053* (2013.01); *H04L 1/0038* (2013.01); *H04L 5/0023* (2013.01);
 (Continued)

(58) Field of Classification Search
 CPC ... H04L 5/0053; H04L 1/0038; H04L 5/0023; H04L 5/0048; H04L 5/0051;
 (Continued)

(56) References Cited

U.S. PATENT DOCUMENTS 10,791,567 B2    9/2020   Sun .................. H04L 5/0094
2011/0255483 A1  10/2011  Xu et al.
(Continued)

FOREIGN PATENT DOCUMENTS

CN      104185960 A      12/2014
WO   WO-2017196612 A1   11/2017   .......... H04B 7/0404

OTHER PUBLICATIONS

Samsung, "Coreset Configurations", 3GPP TSG RAN WG1 NR ad-Hoc#2, Jun. 27-30, 2017, R1-1710693.
(Continued)

*Primary Examiner* — Jean B Corrielus

(74) *Attorney, Agent, or Firm* — BRYAN CAVE LEIGHTON PAISNER LLP

(57) ABSTRACT

A method for receiving a signal by a terminal in a wireless communication system according to an embodiment of the present invention can comprise a step for determining REGs, which are to be assumed that the same precoding is used, among REGs comprised in a control resource set on the basis of information relating to precoder granularity, and thus monitoring a control channel candidate. Particularly, if a part of resource blocks overlaps another resource region and particular resource blocks in the resource blocks are no longer contiguous due to the overlapping, the terminal can comprise an assumption that the same precoding is used with respect to the REGs comprised in the particular resource blocks even if the information relating to the precoder granularity corresponds to first configuration.

10 Claims, 11 Drawing Sheets

Related U.S. Application Data continuation of application No. 16/636,853, filed as application No. PCT/KR2018/008893 on Aug. 6, 2018, now Pat. No. 11,133,892.

(60) Provisional application No. 62/586,146, filed on Nov. 14, 2017, provisional application No. 62/541,775, filed on Aug. 6, 2017.

(51) Int. Cl.
   *H04L 25/02* (2006.01)
   *H04L 27/26* (2006.01)

(52) U.S. Cl.
   CPC .......... *H04L 5/0048* (2013.01); *H04L 5/0051* (2013.01); *H04L 5/0094* (2013.01); *H04L 25/0224* (2013.01); *H04L 27/2649* (2013.01)

(58) Field of Classification Search
   CPC .............. H04L 5/0094; H04L 25/0224; H04L 27/2649; H04L 5/0007; H04B 7/0456; H04B 7/0695
   See application file for complete search history.

(56) References Cited

U.S. PATENT DOCUMENTS

| | | | |
|---|---|---|---|
| 2016/0028505 A1 | 1/2016 | Pi | H04L 1/0068 714/807 |
| 2018/0205487 A1 | 7/2018 | Soong | H04W 72/044 |
| 2018/0324770 A1 | 11/2018 | Nogami | H04L 5/005 |
| 2019/0037577 A1* | 1/2019 | Sun | H04W 72/51 |
| 2019/0253308 A1 | 8/2019 | Huang | H04B 7/0695 |
| 2020/0014515 A1 | 1/2020 | Qin | H04L 5/0012 |
| 2020/0022121 A1 | 1/2020 | Li | H04L 5/0035 |
| 2020/0119865 A1 | 4/2020 | Jiao | H04L 5/005 |
| 2020/0145142 A1 | 5/2020 | Yoshimura | H04L 1/1887 |
| 2020/0169351 A1 | 5/2020 | Yoshimura | H04L 1/1812 |
| 2020/0235879 A1* | 7/2020 | Lee | H04L 5/0053 |

OTHER PUBLICATIONS

Samsung, "Configuration and Functionalities of Common Search Space", 3GPP TSG RAN WG1 #89, May 15-19, 2017, R1-1707998.

LG Electronics, "Discussion on NR-PDCCH structure", 3GPP TSG RAN WG1 NR Ad-hoc#2, Jun. 27-30, 2017, R1-1710303.

Nokia: "On the PDCCH construction for NR", R1-1710978, 3GPP TSG RAN WG1 NR Ad-Hoc #2, Qingdao, China, Jun. 27-30, 2017.

Huawei: "Transmit diversity for DL control channel", R1-1706941, 3GPP TSG RAN WG1 Meeting #89, Hangzhou, China, May 15-19, 2017.

Huawei: "Overview of PDCCH-CCE-REG mapping and REG bundling", R1-1710011, 3GPP TSG RAN WG1 NR Ad-Hoc Meeting, Qingdao, China, Jun. 27-30, 2017.

Samsung: "Resource Mapping for PDCCH", R1-1710691, 3GPP TSG RAN WG1 NR Ad-Hoc #2, Qingdao, China, Jun. 27-30, 2017.

* cited by examiner

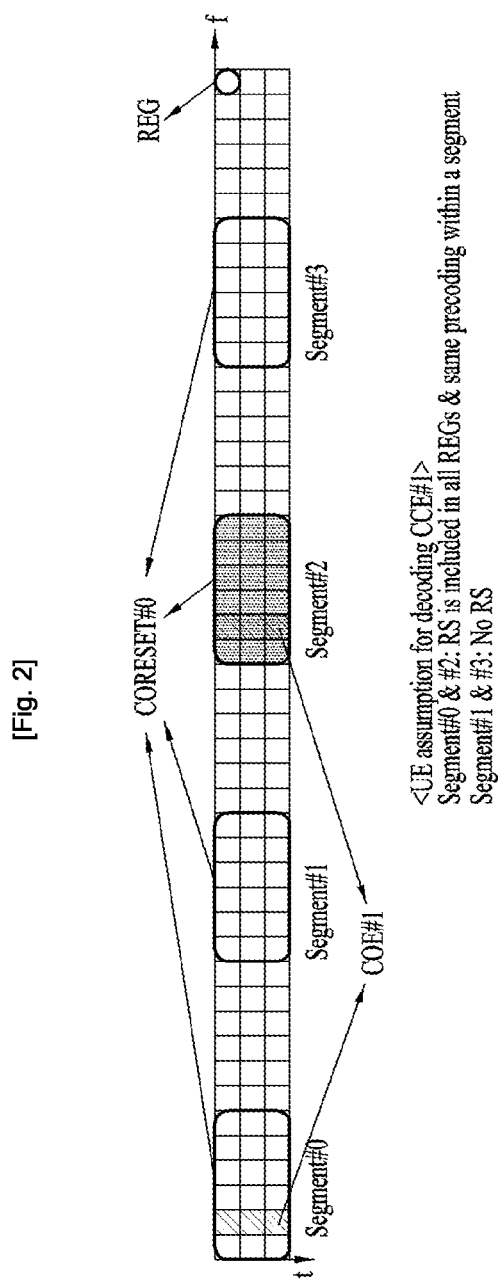
[Fig. 2]

[Fig. 3]
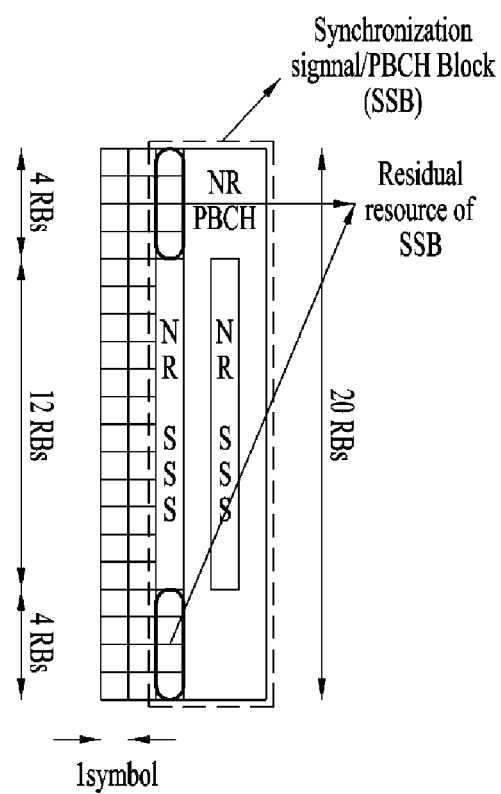

[Fig. 4]
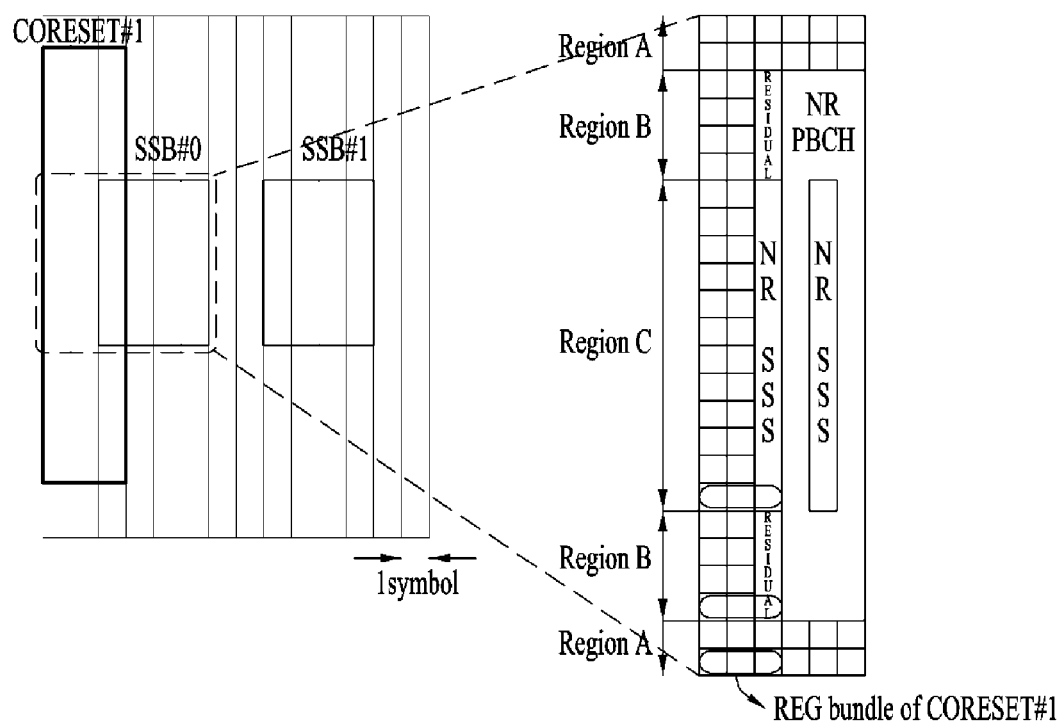

[Fig. 5]
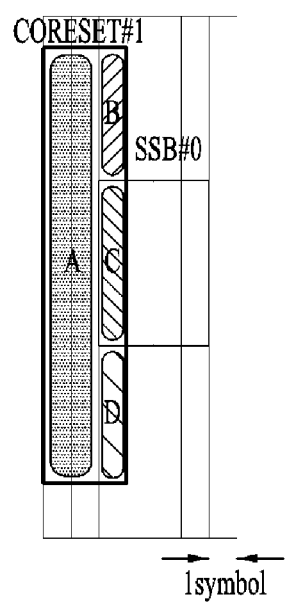

[Fig. 6]
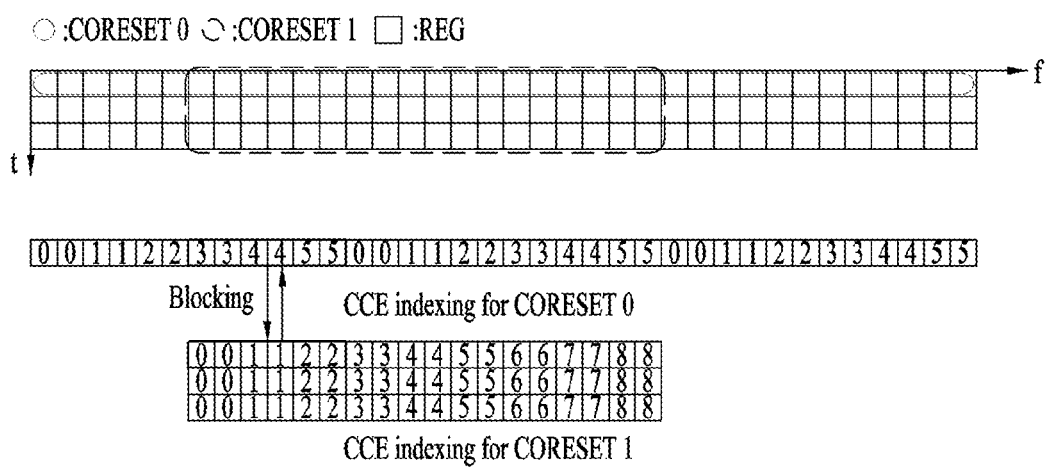

[Fig. 7]
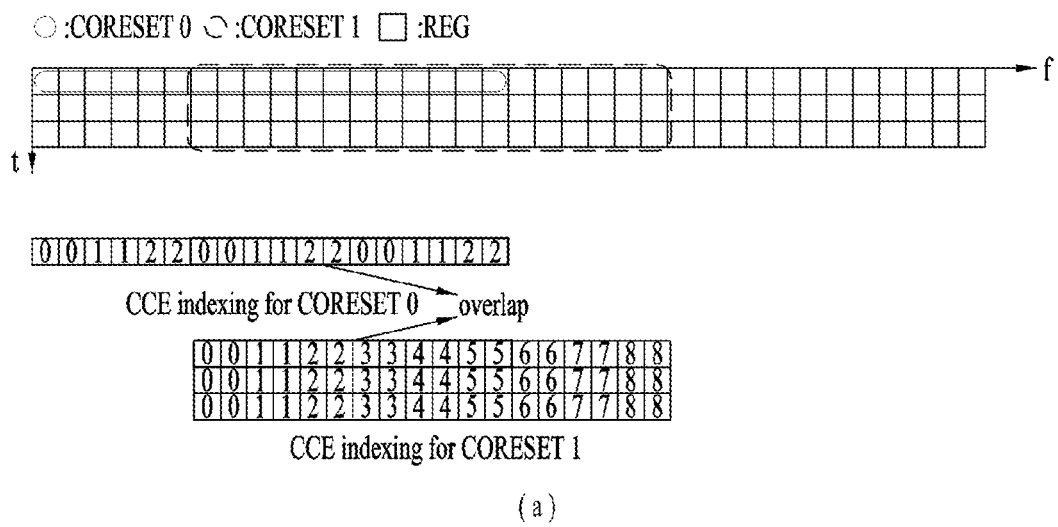
(a)
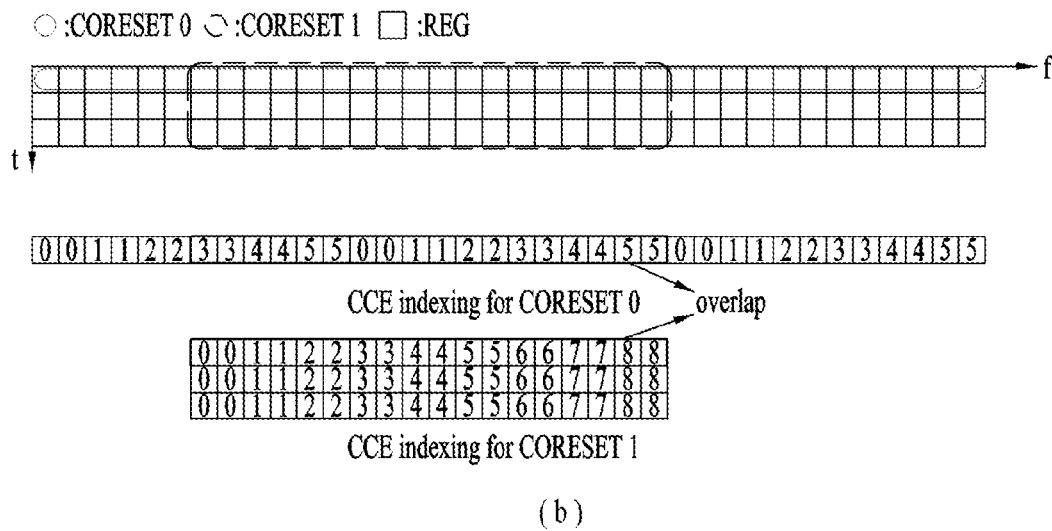
(b)

[Fig. 8]
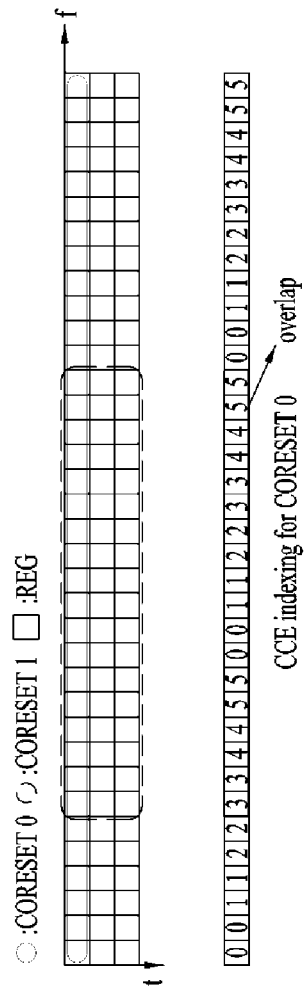
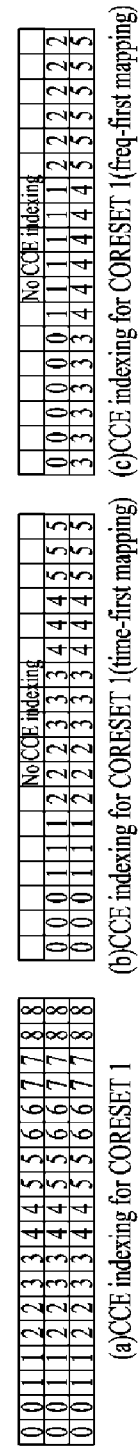

[Fig. 9]
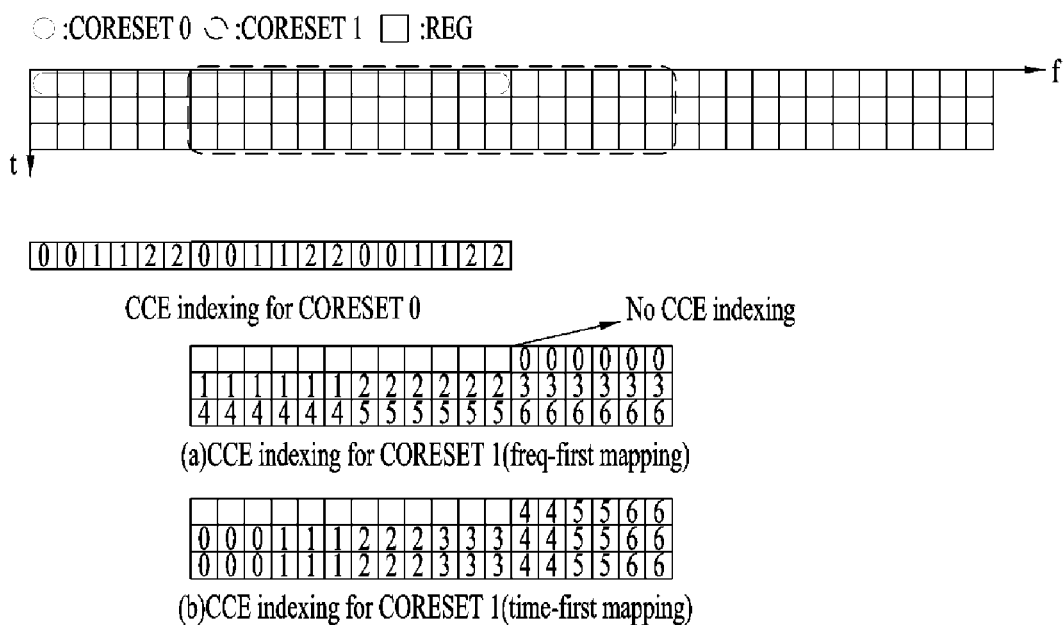

[Fig. 10]
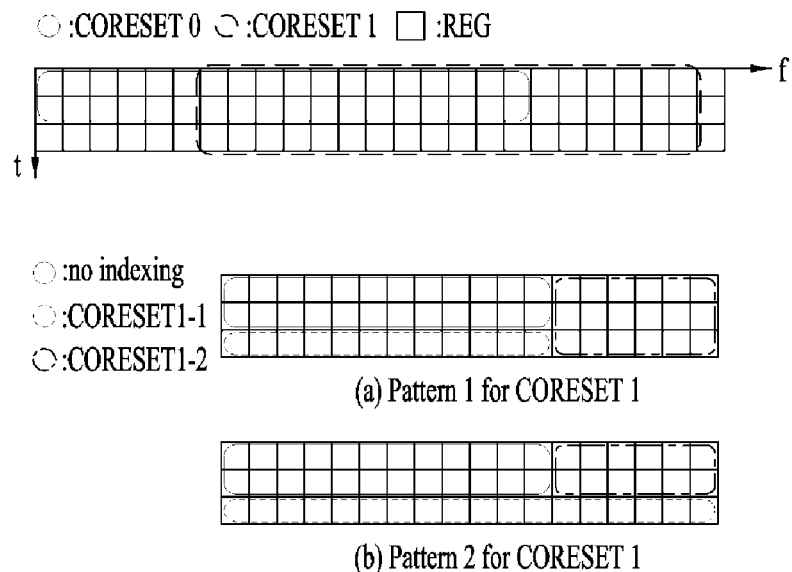
[Fig. 11]
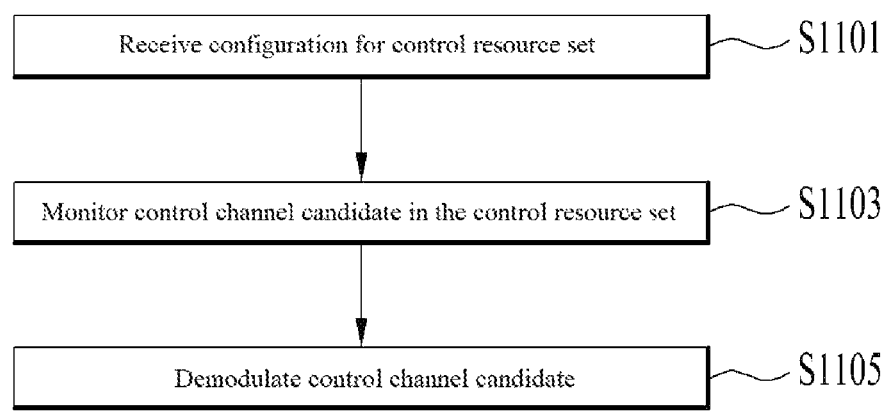

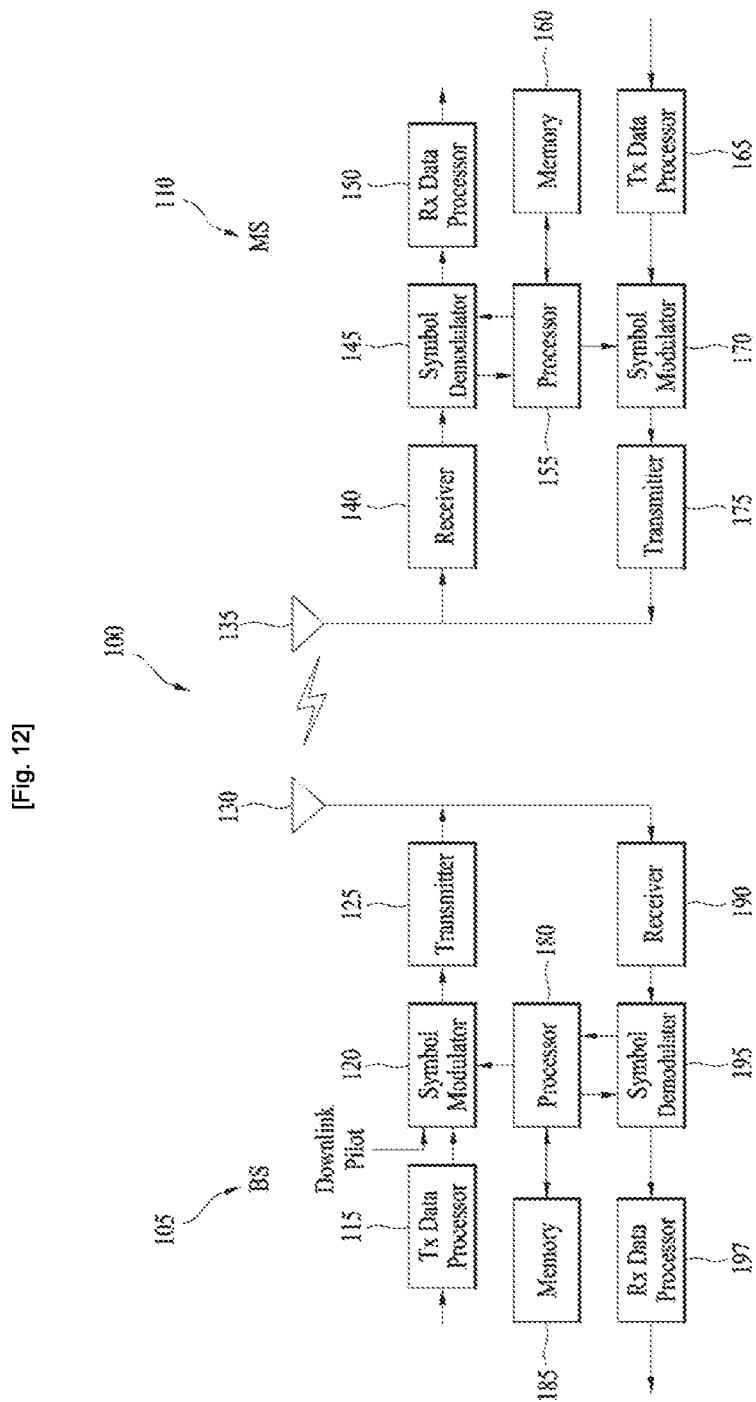
[Fig. 12]

METHOD AND DEVICE FOR RECEIVING SIGNAL IN WIRELESS COMMUNICATION SYSTEM

This application is a Continuation of U.S. patent application Ser. No. 17/410,935 filed Aug. 24, 2021 (now U.S. Pat. No. 11,569,963 issued Jan. 31, 2023), which is a Continuation of U.S. patent application Ser. No. 16/636,853 filed Feb. 5, 2020 (now U.S. Pat. No. 11,133,892 issued Sep. 28, 2021), which is a National Stage Entry of International Application No. PCT/KR2018/008893 filed Aug. 6, 2018, which claims the benefit of U.S. Provisional Application Nos. 62/541,775 filed Aug. 6, 2017 and 62/586,146 filed Nov. 14, 2017, all of which are hereby incorporated by reference in their entirety for all purposes as if fully set forth herein.

TECHNICAL FIELD

The present disclosure relates to a wireless communication system, and to a method for receiving a signal and a device therefor. In particular, the present disclosure relates to a method and device for receiving a control signal.

BACKGROUND ART

First, the existing 3GPP LTE/LTE-A system will be briefly described. Referring to FIG. 1, a user equipment (UE) performs an initial cell search (S101). In the initial cell search process, the UE receives a Primary Synchronization Channel (P-SCH) and a Secondary Synchronization Channel (S-SCH) from a base station (BS), performs downlink synchronization with the BS, and acquires information such as a cell ID. Thereafter, the UE acquires system information (e.g., MIB) through a PBCH (Physical Broadcast Channel). The UE can receive the DL RS (Downlink Reference Signal) and check the downlink channel status.

After the initial cell search, the UE can acquire more detailed system information (e.g., SIBs) by receiving a Physical Downlink Control Channel (PDCCH) and a Physical Downlink Control Channel (PDSCH) scheduled by the PDCCH (S102).

The UE may perform a random access procedure for uplink synchronization. The UE transmits a preamble (e.g., Msg1) through a physical random access channel (PRACH) (S103), and receives a response message (e.g., Msg2) for the preamble through PDCCH and PDSCH corresponding to the PDCCH. In the case of a contention-based random access, a contention resolution procedure such as additional PRACH transmission (S105) and PDCCH/PDSCH reception (S106) may be performed.

Then, the UE can perform PDCCH/PDSCH reception (S107) and Physical Uplink Shared Channel (PUSCH)/Physical Uplink Control Channel (PUCCH) transmission (S108) as a general uplink/downlink signal transmission procedure. The UE can transmit UCI (Uplink Control Information) to the BS. The UCI may include HARQ ACK/NACK (Hybrid Automatic Repeat reQuest Acknowledgment/Negative ACK), SR (Scheduling Request), CQI (Channel Quality Indicator), PMI (Precoding Matrix Indicator) and/or RI etc.

DISCLOSURE

Technical Problem

An object of the present disclosure is to provide a method for receiving a signal by a terminal to efficiently monitor control channel candidates in a control resource configured in a wireless communication system and a device therefor.

It is to be understood that both the foregoing general description and the following detailed description of the present invention are exemplary and explanatory and are intended to provide further explanation of the invention as claimed.

Technical Solution

The present disclosure provides a method and device for receiving a signal in a wireless communication system.

In one aspect of the present disclosure, a method of receiving a signal by a terminal in a wireless communication system may include receiving a configuration for a control resource set, the information including information about precoder granularity, and monitoring a control channel candidate by determining resource element groups (REGs) for which the same precoding is assumed to be used among REGs included in the control resource set based on the information about the precoder granularity, wherein, based on the information about the precoder granularity being related to a first configuration, the terminal may assume that the same precoding is used for REGs included in contiguous resource blocks in the control resource set, wherein, based on some of the resource blocks overlapping with other resource region, even when specific resource blocks in the resource blocks are no longer contiguous to each other due to the overlapping, the terminal may assume, based on the first configuration, that the same precoding is used for the REGs included in the specific resource blocks.

The other resource region may be a synchronization signal block.

Based on the information about the precoder granularity being related to the first configuration, the terminal may assume that demodulation reference signal (DMRSs) for the control channel candidate are mapped to all the REGs included in the contiguous resource blocks, wherein the terminal may assume that the DMRSs for the control channel candidate are not mapped to a REG included in the resource block belonging to the overlapped region.

In addition, the terminal may perform channel estimation, assuming that the same precoding is used for the mapped DMRSs, and perform demodulation of the control channel candidate according to a result of the channel estimation.

In addition, the specific resource blocks may include a first resource block and a second resource block, the first resource block and the second resource block being discontiguous to each other, wherein the terminal may independently perform the channel estimation on each of the first resource block and the second resource block.

The terminal may assume the same Quasi Co-Located (QCL) for the REGs included in the specific resource blocks, wherein information about the QCL may be included in the configuration for the control resource set.

The terminal may skip monitoring of a control channel candidate including a resource block belonging to the overlapped region.

Based on the other resource region being a control channel transmitted by another control resource set, the terminal may monitor the control channel candidate based on priorities of the control resource set and the other control resource set, wherein, based on the priority of the other control resource set being higher than the priority of the control resource set, the terminal may skip monitoring of a control channel candidate including a resource block belonging to the overlapped region or perform resource indexing of the control resource set except for the control channel candidate including the resource block belonging to the overlapped region.

In addition, based on resource indexing of the control resource set being performed except for the control channel candidate including the resource block belonging to the overlapped region, the control resource set may be divided into a plurality of control resource subsets, wherein a configuration for each of the plurality of control resource subsets may be determined separately from the configuration for the control resource set due to the overlapped region.

In another aspect of the present disclosure, a terminal for receiving a signal in a wireless communication system may include a transceiver, and a processor configured to control the transceiver, wherein the processor is configured to control the transceiver to receive a configuration for a control resource set, the information including information about precoder granularity, and monitor a control channel candidate by determining resource element groups (REGs) for which the same precoding is assumed to be used among REGs included in the control resource set based on the information about the precoder granularity, wherein, based on the information about the precoder granularity being related to a first configuration, the terminal may assume that the same precoding is used for REGs included in contiguous resource blocks in the control resource set, wherein, based on some of the resource blocks overlapping with another resource region, even when specific resource blocks in the resource blocks are no longer contiguous to each other due to the overlapping, the processor may assume, based on the first configuration, that the same precoding is used for the REGs included in the specific resource blocks.

In addition, based on the information about the precoder granularity being related to the first configuration, the processor may assume that demodulation reference signal (DMRSs) for the control channel candidate are mapped to all the REGs included in the contiguous resource blocks, wherein the processor may assume that the DMRSs for the control channel candidate are not mapped to a REG included in the resource block belonging to the overlapped region.

In addition, the processor may perform channel estimation, assuming that the same precoding is used for the mapped DMRSs, and perform demodulation of the control channel candidate according to a result of the channel estimation.

Additionally, the specific resource blocks may include a first resource block and a second resource block, the first resource block and the second resource block being discontiguous to each other, wherein the processor may independently perform the channel estimation on each of the first resource block and the second resource.

The processor may assume the same Quasi Co-Located (QCL) for the REGs included in the specific resource blocks, wherein information about the QCL may be included in the configuration for the control resource set.

The other resource region may be a synchronization signal block, wherein the processor may skip monitoring of a control channel candidate including a resource block belonging to the overlapped region.

It will be understood by those skilled in the art that the above-described aspects of the present disclosure are merely part of the embodiments of the present disclosure and various modifications and alternatives could be developed from the following technical features of the present disclosure.

Advantageous Effects

According to an example of the present disclosure, in monitoring control channel candidates in a control resource set, a terminal may be allowed to more efficiently monitor the control channel candidates in the control resource configured in consideration of overlapping with other resources.

It will be appreciated by persons skilled in the art that that the effects that could be achieved with the present disclosure are not limited to what has been particularly described hereinabove and other advantages of the present invention will be more clearly understood from the following detailed description taken in conjunction with the accompanying drawings.

DESCRIPTION OF DRAWINGS

FIG. 2 illustrates an example of a CORESET having precoder granularity corresponding to all contiguous resource blocks.

FIG. 3 illustrates an example of an SSB.

FIG. 4 illustrates overlapping of a CORESET and an SSB according to an example of the present disclosure.

FIG. 5 illustrates overlapping of a CORESET and an SSB in a case where precoder granularity of the CORESET corresponds to all contiguous resource blocks, according to an example of the present disclosure.

FIGS. 6 to 10 illustrate operations according to overlapping and priorities of CORESETs according to an example of the present disclosure.

FIG. 11 is a conceptual diagram of a signal reception method according to examples of the present disclosure.

FIG. 12 illustrates a base station (BS) and a user equipment (UE) according to an example of the present invention.

BEST MODE

Figure 1:
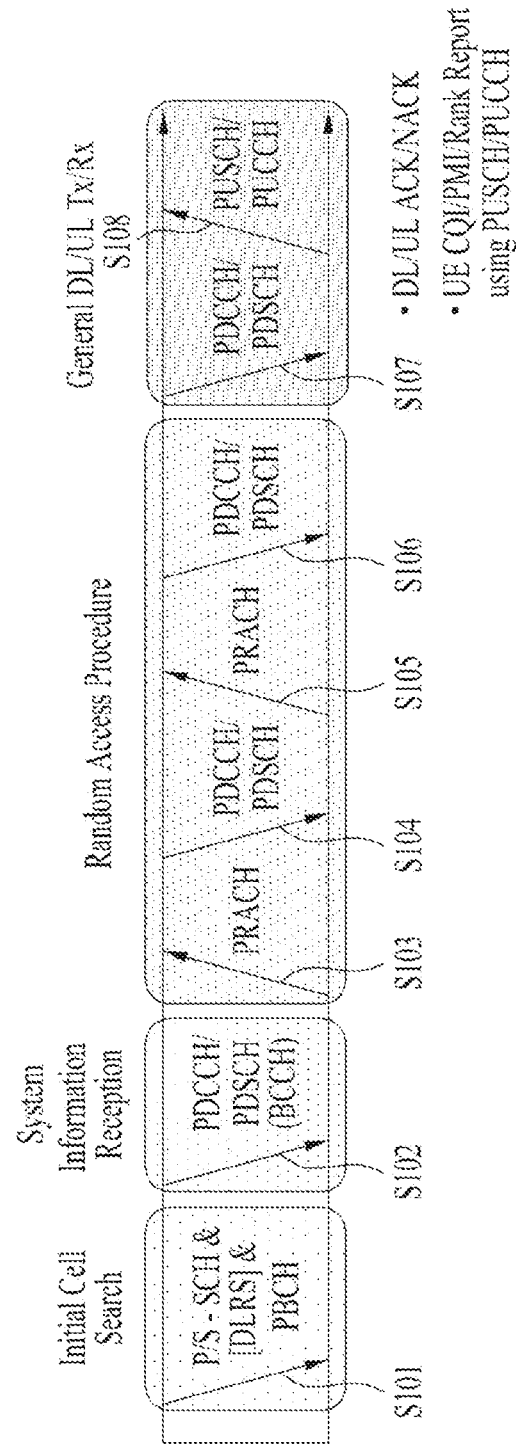
FIG. 1 illustrates physical channels used in a 3GPP LTE/LTE-A system and a general signal transmission method using the physical channels.

The following description of examples of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP LTE system or 3GPP LTE-A system, by which the technical idea of the present invention may be non-limited. Specific terminologies used in the following description are provided to help understand the present invention and the use of the terminologies can be modified to a different form within a scope of the technical idea of the present invention.

As many as possible communication devices have demanded as high as communication capacity and, thus, there has been a need for enhanced mobile broadband (eMBB) communication compared with legacy radio access technology (RAT) in a recently discussed next-generation communication system. In addition, massive machine type communications (mMTC) for connecting a plurality of devices and objects to provide various services anytime and anywhere is also one of factors to be considered in next-generation communication. In addition, in consideration of a service/user equipment (UE) that is sensitive to reliability and latency, ultra-reliable and low latency communication (URLLC) has been discussed for a next-generation communication system.

As such, new RAT that considers eMBB, mMTC, URLCC, and so on has been discussed for next-generation wireless communication.

Some LTE/LTE-A operations and configuration that are not at variance to a design of New RAT may also be applied to new RAT. For convenience, new RAT may be referred to as 5G mobile communication.

1. NR Frame Structure and Physical Resource

In a new RAT (NR) system, downlink (DL) and downlink (UL) transmission may be performed through frames having duration of 10 ms and each frame may include 10 subframes. Accordingly, 1 subframe may correspond to 1 ms. Each frame may be divided into two half-frames.

1 subframe may include $N_{symb}^{subframe,\mu} = N_{symb}^{slot} \times N_{slot}^{subframe,\mu}$ contiguous OFDM symbols. $N_{symb}^{slot}$ represents the number of symbols per slot, $\mu$ represents OFDM numerology, and $N_{slot}^{subframe,\mu}$ represents the number of slots per subframe with respect to corresponding $\mu$. In NR, multiple OFDM numerologies shown in Table 1 below may be supported.

TABLE 1

| $\mu$ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In Table 1 above, $\Delta f$ refers to subcarrier spacing (SCS). $\mu$ and cyclic prefix with respect to a DL carrier bandwidth part (BWP) and $\mu$ and cyclic prefix with respect to a UL carrier BWP may be configured for a UE via UL signaling.

Table 2 below shows the number of $N_{symb}^{slot}$ of symbols per slot, the number $N_{slot}^{frame,\mu}$ of symbols per frame, and the number $N_{slot}^{subframe,\mu}$ of slots per subframe with respect to each SCS in the case of normal CP.

TABLE 2

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

Table 3 below shows the number $N_{symb}^{slot}$ of symbols per slot, the number $N_{slot}^{frame,\mu}$ of slots per frame, and the number $N_{slot}^{subframe,\mu}$ of slots per subframe with respect to each SCS in the case of extended CP.

TABLE 3

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

As such, in an NR system, the number of slots included in 1 subframe may be changed according to subcarrier spacing (SCS). OFDM symbols included in each slot may correspond to any one of D (DL), U (UL), and X (flexible). DL transmission may be performed in a D or X symbol and UL transmission may be performed in a U or X symbol. A Flexible resource (e.g., X symbol) may also be referred to as a Reserved resource, an Other resource, or a Unknown resource.

In NR, one resource block (RB) may correspond to 12 subcarriers in the frequency domain. A RB may include a plurality of OFDM symbols. A resource element (RE) may correspond to 1 subcarrier and 1 OFDM symbol. Accordingly, 12 REs may be present on 1 OFDM symbol in 1 RB.

A carrier BWP may be defined as a configured of contiguous physical resource blocks (PRBs). The carrier BWP may also be simply referred to as a BWP. A maximum of 4 BWPs may be configured for each of UL/DL link in 1 UE. Even if multiple BWPs are configured, 1 BWP may be activated for a given time period. However, when a supplementary uplink (SUL) is configured in a UE, 4 BWPs may be additionally configured for the SUL and 1 BWP may be activated for a given time period. A UE may not be expected to receive a PDSCH, a PDCCH, a channel state information—reference signal (CSI-RS), or a tracking reference signal (TRS) out of the activated DL BWP. In addition, the UE may not be expected to receive a PUSCH or a PUCCH out of the activated UL BWP.

2. NR DL Control Channel

In an NR system, a transmissions NR system, a transmission unit of a control channel may be defined as a resource element group (REG) and/or a control channel element (CCE), etc. The CCE may refer to a minimum unit for control channel transmission. That is, a minimum PDCCH size may correspond to 1 CCE. When an aggregation level is equal to or greater than 2, a network may group a plurality of CCEs to transmit one PDCCH (i.e., CCE aggregation).

An REG may correspond to 1 OFDM symbol in the time domain and may correspond to 1 PRB in the frequency domain. In addition, 1 CCE may correspond to 6 REGs.

A control resource configured (CORESET) and a search space (SS) are briefly described now. The CORESET may be a configured of resources for control signal transmission and the search space may be aggregation of control channel candidates for perform blind detection. The search space may be configured for the CORESET. For example, when one search space is defined on one CORESET, a CORESET for a common search space (CSS) and a CORESET for a UE-specific search space (USS) may each be configured. As another example, a plurality of search spaces may be defined in one CORESET. For example, the CSS and the USS may be configured for the same CORESET. In the following example, the CSS may refer to a CORESET with a CSS configured therefor and the USS may refer to a CORESET with a USS configured therefor, or the like.

An eNB may signal information regarding a CORESET to a UE. For example, a CORESET configuration for each CORESET may be signaled to the UE, and the CORESET configuration may be signaled in time duration (e.g., 1/2/3 symbol) of the corresponding CORESET, a frequency domain resource of the corresponding CORESET, precoder granularity, an REG-to-CCE mapping type (e.g., interleaved/non-Interleaved), a REG bundling size and an interleaver size in the case of an interleaved REG-to-CCE mapping type, and so on.

When REG-to-CCE mapping with respect to 1-symbol CORESET is a non-interleaved type, 6 REGs with respect to a CCE are grouped to one REG bundle and all REGs of the corresponding CCE may be contiguous. When a plurality of CCEs is present in 1 PDCCH (e.g., when an aggregation level is equal to or greater than 2), CCEs may also be contiguous. A UE may assume the same precoding in 1 REG bundle or may assume the same precoding with respect to a plurality of REG bundles.

When REG-to-CCE mapping with respect to 1-symbol CORESET is an interleaved type, 2, 3, or 6 REGs may configure 1 REG bundle. For example, all REG bundle sizes of 2, 3, and 6 are not supported but, as a subset thereof, for example, an REG bundle size of {2}, {3}, {2,3}, {2,6}, {3,6}, or {2,3,6} may be supported. When an REG bundle size of {2, 6} is supported, 2 REGs may configure 1 REG bundle or 6 REGs may configure 1 REG bundle. A UE may assume the same precoding in 1 REG bundle or may assume the same precoding with respect to a plurality of REGs according to precoder granularity.

In the case of REG-to-CCE mapping with respect to a CORESET having duration of 2 symbols or greater, a REG bundle may be defined in time/frequency domain. When an REG bundle is defined in the time domain, all REGs belonging to 1 REG bundle may belong to the same RB and may correspond to different symbols. When an REG bundle is defined in the time-frequency domain, 1 REG bundle may include REGs belonging to different RBs as well as REGs that belong to the same RB and correspond to different symbols.

Time-first mapping may be supported for REG-to-CCE mapping with respect to a CORESET having duration of 2 symbols or greater. An REG bundle may be supported to be configured on the time domain in the same way as time domain duration of a CORESET. In the case of non-interleaved type, 6 REGs included in a CCE may correspond to 1 REG bundle and REGs of the corresponding CCE may be localized in the time/frequency domain. In the case of an interleaved type, 2, 3, or 6 REGs may correspond to 1 REG bundle and REG bundles may be bundled in a CORESET.

A UE may assume the same precoding in 1 REG bundle or may assume the same precoding with respect to a plurality of REGs according to precoder granularity.

3. Assumption of Precoding for REGs in CORESET

In the NR system, a DL control channel based on a Demodulation Reference Signal (DMRS) may be transmitted by a BS. In addition, a UE receives a DMRS-based DL control channel from the BS. In addition, the UE may decode the DL control channel based on the DMRS. In particular, the UE may perform channel estimation based on the DMRS and demodulate the DL control channel according to the result of the channel estimation.

In this case, a reference signal (RS) for demodulation of the DL control channel may be transmitted only in REGs to which the DL control channel is allocated among DL resources transmitted by the BS. In this case, the number of RSs or RS density may be insufficient, and thus the channel estimation performance of the UE may be degraded during decoding of the DL control channel.

REG bundling has been introduced to prevent or mitigate degradation channel estimation performance. As described above, when an REG bundle is defined in the time-frequency domain, one REG bundle may include not only REGs belonging to the same RB and corresponding to different symbols, but also REGs belonging to different RBs.

The network or the BS may configure precoder granularity to increase DL control channel reception performance of the UE.

Precoder granularity has a value for a range of REGs in which the same precoding is used among a plurality of REGs. Upon receiving information on the precoder granularity, the UE may assume a range of REGs in which the same precoding is used among a plurality of REGs.

The UE may make an additional related assumption other than the precoder granularity based on the information on the precoder granularity. For example, the UE may assume the range of REGs to which an RS is mapped based on the information on the precoder granularity.

Precoder granularity may be configured with respect to the frequency domain (precoder granularity in frequency domain).

The precoder granularity may be configured to increase DL control channel reception performance of a UE (a cell edge UE) located at the edge of a specific cell. The precoder granularity may be configured for each UE. The network/BS may transmit a message of a physical layer or a radio resource control (RRC) layer related to configuration of precoder granularity to the UE.

The network/BS may configure precoder granularity for each CORESET. The network/BS may transmit, to the UE, information about the precoder granularity in the CORESET configuration. The information about the precoder granularity may correspond to a first configuration or a second configuration. The first configuration may be configuring precoder granularity as a wideband RS, and the second configuration may be configuring precoder granularity according as a REG bundle size.

Hereinafter, expression such as "precoder granularity is configured as the wideband RS," "the wideband RS is configured or applied for a CORESET," and "precoder granularity is configured as a set of contiguous RBs" may have the same meaning as expressions such as "precoder granularity is indicated by all contiguous Resource Blocks" or "precoder granularity corresponds to all contiguous Resource Blocks."

When the precoder granularity corresponds to all contiguous RBs, the UE assumes that RSs are mapped to all REGs included in a set of contiguous RBs. In addition, the UE may assume the same precoding being used across all the resource-element groups within the set of contiguous resource blocks in the CORESET.

Hereinafter, the expression "precoder granularity is configured as the REG bundle size" may have the same meaning as "precoder granularity is indicated to be the same as the REG bundle" or "precoder granularity is the same as the REG-bundle."

When the precoder granularity is the same as the REG bundle, the UE assumes that an RS is mapped within a plurality of REG bundles constituting a corresponding control channel candidate. In addition, the UE may assume the same precoding being used within a REG bundle.

The mapped RS may be a DMRS for demodulation of a control channel candidate in the CORESET.

FIG. 2 illustrates an example in which precoder granularity is configure as all contiguous resource blocks.

FIG. 2 illustrates a case where one CORESET is composed of four segments in a 6-RB unit. The figure also illustrates that CCE #1 is composed of two REG bundles belonging to segment #0 and segment #2. When the UE performs blind decoding (BD) on CCE #1, the UE may assume that the RS is present in all REGs of segment #0, and that the same precoding is used across all the REGs of segment #0. In addition, the UE may assume that the RS is present in all REGs of segment #2, and that the same precoding is used across all the REGs of segment #2. Here, since segment #0 and segment #2 are not contiguous RBs, the UE may not assume that the same precoding is used across all the REGs in segment #0 and segment #2.

When CCE #1 is assumed to be composed of contiguous RBs (segment #0 and segment #2 are assumed to be continuous in the time or frequency domain), the UE may perform channel estimation and decoding on the assumption that the RS is present in all REGs of CCE #1 and that the same precoding used across all the REGs of CCE #1.

4. Synchronization Signal and PBCH Block (SSB)

FIG. 3 illustrates an example of a synchronization signal and PBCH block (hereinafter, SSB). One or more SSBs may be defined in the NR system. In FIG. 3, it is illustrated that an SSB starts on the third symbol in a slot. The SSB may be referred to as a synchronization signal block in the following description.

As shown in FIG. 3, an SSB may include a primary synchronization signal (PSS), a secondary synchronization signal (SSS), and a PBCH. The PSS is mapped to 12 contiguous RBs in a specific symbol and transmitted, and the SSS is mapped to 12 contiguous RBs in a symbol different from that of the PSS.

The PBCH is mapped to a region other than the region in which the SSS is transmitted in a bandwidth of 20 RBs in three contiguous symbols and transmitted. 4 RBs adjacent to the frequency domain just below and above the PSS in the symbol in which the PSS is transmitted may be used for any purpose. The 4RBs adjacent to the frequency domain just below and above the PSS may be referred to as residual resources.

5. CORESET Overlapped with SSB

Hereinafter, a method for operation of a BS and a UE is proposed when resources to which a CORESET is allocated and resources to which an SSB is allocated overlap with each other (hereinafter, referred to as "the CORESET overlaps with the SSB") is proposed.

As shown in FIG. 4, the time and frequency resources to which a CORESET is allocated are the same as the time and frequency resources to which the SSB is allocated, the resources to which the CORESET is allocated may be expressed as overlapping with the resources to which the SSB is allocated.

The following description is applicable not only the case where a CORESET overlap with an SSB, but also to a case where a specific CORESET overlaps with other resources such as rate matching resources, paging resources, resources used for beam sweeping, or another CORESET.

FIGS. 3 and 4 illustrate a case where the SSB starts on the third symbol in a slot. However, in the NR system, when non slot-based scheduling is used, the start symbol of a CORESET may be any symbol in the slot. In addition, according to a transmission beam configuration of the BS, the SSB may be transmitted, taking any symbol in the slot as a start symbol. In view of the above, a CORESET and an SSB may overlap with each other at any position in the slot.

In the NR system, a network/BS may transmit and receive control information and data information based on one or more analog beams, digital beams, or a combination thereof. Each UE may report to the network/BS a beam determined to have the best reception performance based on measurement of each beam. The network/BS may configure a transmission beam for each UE based on the reports received from the UEs.

Each UE may configure a reception (Rx) beam for a specific resource region based on spatial quasi-co located (QCL) information indicated by the network/BS. The specific resource region may be a CORESET region for control channel reception or a PDSCH region for data channel reception.

Here, the spatial QCL information may be indicated by a transmission configuration indicator (TCI). In the NR system, the TCI may be configured differently for each CORESET.

If there is a CORESET for the UE to monitor in the initial access stage, in which it is difficult to receive additional information other than the relevant information from the network or the BS, the UE perform monitoring of the CORESET and decoding on the assumption that a transmission beam and/or an Rx beam such as an SSB which provides information about the CORESET is available.

In the NR system, beam management, and radio resource management (RRM) for a serving cell, and radio link monitoring (RLM) measurement may be performed by the UE based on a channel state information-reference signal (CSI-RS) configured by the network/BS. Alternatively, the beam management, RRM, and RLM measurement may be performed based on one or more of the DMRS (included in the PBCH in the SSB) and the SSS included in the SSB received by the UE.

5.1. QCL Assumption of CORESET Overlapped with SSB for PDCCH Decoding

Hereinafter, an operation method that may be assumed or configured by a UE or a BS when a CORESET overlaps with an SSB will be described.

In the NR system, beam information to be assumed in a corresponding CORESET may be configured differently for each CORESET. That is, the spatial QCL or TCI state described above may be configured differently for each CORESET. In addition, a different monitoring periodicity may be configured for each of a plurality of search space sets belonging to the same CORESET. The UE may monitor a corresponding search space at a monitoring time according to the monitoring period periodicity configuration.

The monitoring periodicity of a search space set may be configured separately from the transmission periodicity of the SSB. Accordingly, when the UE is to monitor a control channel candidate at a monitoring time according to the monitoring periodicity of a specific search space set (a sub-period of the monitoring periodicity of the search space set), the frequency resource region to which a CORESET is allocated may overlap with the frequency resource region to which an SSB is allocated.

In FIG. 4, CORESET #1 is a CORESET (of duration 3) allocated to 3 symbols, and it is assumed that the REG bundle size is 3 REGs. FIG. 4 illustrates a case where the last symbol of CORESET #1 overlaps with the symbol on which the PSS of SSB #0.

However, as described above, one or more of the PSS, SSS, and PBCH in the SSB may overlap with the CORESET. Hereinafter, an operation performed in a case where a CORESET overlaps with one or more of the PSS, SSS, and PBCH of an SSB will be described.

When a CORESET overlaps with an SSB as shown in FIG. 4, the plurality of REG bundles in the CORESET includes a REG bundle overlapping with the SSB and a REG bundle that does not overlap with the SSB. Referring to FIG. 4, REG bundles belonging to Region A do not overlap with the SSB. The REG bundles in Region B overlap, in the last REG (3rd symbol), with the residual resource whose usage is not designated within the SSB. It may be seen that the REG bundles belonging to Region C overlap with the PSS in the last REG.

When a CORESET overlaps with an SSB as shown in FIG. 4, the UE may perform monitoring or decoding on the CORES SET by dividing a resource region where overlapping occurs and a resource region where overlapping does not occur. In this case, the UE may perform RRM and RLM measurement based on a specific signal e.g., DMRS) in the SSB. Hereinafter, the expression that the UE receives a CORESET using a specific Rx beam may be replaced by the expression that the UE monitors/decodes a signal allocated to a resource in the CORESET using the specific Rx beam.

In addition, when the UE receives a CORESET on a symbol overlapping with the symbol on which the SSB is received, the UE may perform a reception operation using an Rx beam related to the SSB.

On the contrary, when the UE receives a CORESET on a symbol overlapping with the symbol on which the SSB is received, it may use an Rx beam different from the Rx beam related to the SSB.

Accordingly, an Rx beam assumed by the UE in receiving the CORESET should be determined.

Hereinafter, methods for addressing such a situation are discussed. The methods described below may be implemented alone or in combination. A signal indicating execution of an operation according to implementation of one or a combination of the methods described below may be transmitted from the BS to the UE through a physical layer/high layer signal. Hereinafter, the expression that the puncturing operation is performed on a certain resource means that the UE assumes that a signal is mapped to the resource but does not decode the signal received on the resource. The expression that the rate matching operation is performed excluding a certain resource means that the UE assumes that a certain signal is not mapped to the resource, and also means that the UE does not decode the signal received on the resource.

A common feature of the puncturing and rate matching is that the resource of interest is not decoded. Hereinafter, based on this, the UE may assume that rate matching has been performed instead of assuming that puncturing has been performed by.

As such, when a CORESET and an SSB overlap with each to other, the UE may receive a signal assuming that puncturing is performed only in a resource region overlapping with the SSB in both the time and frequency domains among the resources positioned in the CORESET.

The UE may assume that the BS transmits a signal by performing REG and CCE indexing according to a CORESET configuration on resources different from the overlapped resource region in both the time and frequency domains.

Alternatively, the UE may receive a signal assuming that puncturing is performed on a resource region overlapping with the SSB only in the time domain among the resources positioned in the CORESET.

When there is a resource overlapping with the SSB among the resources positioned in the CORESET, the UE may receive a signal assuming that puncturing is performed in the entire frequency domain on the symbol on which the overlapping resources are positioned, which may be expressed as receiving a signal on the assumption of symbol-based puncturing.

According to the symbol-based puncturing, the CORESET configuration may be changed in a slot in which the CORESET overlaps with the SSB. For example, the duration of the CORESET may be changed, and accordingly the REG bundle size may also be changed (or implicitly). Alternatively, the UE may assume that the CORESET configuration is changed.

Specifically, when all the frequency-domain resources positioned on the last symbol in a CORESET of a 3-symbol duration having a REG bundle size of 3 REGs are punctured, the CORESET may be assumed to be a CORESET of a 2-symbol duration in the corresponding slot. In this case, the REG bundle size may be assumed to be 2 REGs. When the REG bundle size is 6 REGs, the configuration or assumption of the REG bundle size may not be changed.

RLM and RRM measurement in the SSB may be cell specific measurement. The UE may perform the RLM and RRM measurement based on the DMRS and/or SSS within the PBCH. The UE may use an Rx beam related to the SSB on a symbol on which RLM and RRM measurement is performed. In addition, the UE may determine whether to assume symbol-based puncturing based on the type of a signal or channel overlapping with the CORESET.

In one example, there may be a case where some of the resources in the CORESET are overlapped only on a symbol on which the PSS is transmitted (while not overlapping with the PBCH and the SSS). In this case, the UE may assume that puncturing on a REG, REG bundle, CCE, or control channel candidate basis is used only in a region in which the PSS is transmitted (or in a region in which the PSS and residual resources are present). In CORESET monitoring, the UE may assume that the CORESET conforms to the spatial QCL information included in the CORESET configuration regardless of the Rx beam for the SSB.

When the CORESET is divided into a plurality of regions as shown in FIG. 4, an operation for each region may be defined. That is, the UE may assume that the resources in Region A overlapping with PSS are punctured, but resources in Region B overlapping with a region whose usage is not defined in the SSB are not punctured and a control channel is transmitted thereon.

For resources in a CORESET positioned in a time domain overlapping with one or more of the PBCH and SSS, the UE may use an Rx beam identical to the Rx beam used for SSB reception (SSB specific Rx beam) to perform RLM and RRM measurement. Even in this case, the UE may assume that symbol-based puncturing is performed in the time domain overlapping with one or more of the PBCH and SSS.

The resources in the CORESET may include resources that overlap with the SSB in the time domain but do not overlap with the SSB in the frequency domain. The UE may define or assume a QCL relationship related to the SSB for such resources without assuming symbol-based puncturing.

In an example, for resources in a CORESET that overlap with the PSS in time domain but not in the frequency domain, the UE may perform decoding based on QCL information pre-configured for the CORESET regardless of the SSB. For resources in the CORESET that overlap with one or more of the PBCH and SSS in the time domain but not in the frequency domain, the UE may perform decoding based on QCL information configured for the SSB.

More broadly, when a resource region in which a specific signal is transmitted and a resource region to which CORESET is allocated overlap with each other in the time domain but do not overlap in the frequency domain, the UE determines a QCL assumption to use for the CORESET based on the specific signal.

This means that, when the resource region where the specific signal is transmitted and the resource region where the CORESET is transmitted overlap with each other in the time domain but do not overlap in the frequency domain, the UE may assume different QCLs among the resources positioned in one REG bundling. Or it means that the REG bundling configured for the CORESET by the BS is not applied to the UE.

Alternatively, without distinguishing an overlapping signal/channel (PSS/SSS/PBCH), the UE may perform decoding on all CORESET resources overlapping with the SSB in the time domain, based on the QCL information of the SSB.

Alternatively, the UE may be configured such that the CORESET conforms to the QCL assumption included in the SSB configuration, for all resources positioned in a slot in which the overlapping occurs. In other words, the UE may use QCL information about the SSB even for CORESET resources that do not overlap with the SSB in the time domain, regardless of the QCL assumption included in the CORESET configuration.

Alternatively, the UE may use the QCL information included in the CORESET configuration (regardless of the QCL assumption for the SSB), assuming puncturing for resources in the CORESET that overlap with the resources on which the SSB is transmitted.

The UE may receive from the BS a signal for configuring whether to decode CORESET resources, using any one of the above-described methods of using the QCL information.

5.2. Resource Overlapping when the Same Precoding is Assumed for all REGs Included in the Set of Contiguous RBs As described above, when precoder granularity corresponds to all contiguous RBs in order to increase the precoder granularity of a CORESET, the UE may receive an RS is transmitted in all REGs included in a set of contiguous RBs. The UE may also assume that the same precoding is used for all REGs included in the set of contiguous RBs.

When a specific REG is included in the set of contiguous RBs and belongs to a control channel candidate on which blind decoding is to be performed, the UE may assume that the RS is transmitted in all REGs in the set of contiguous RBs including the specific REG. In addition, the UE may monitor the control channel candidate assuming that the same precoding is used for all the REGs in the set of contiguous RBs including the specific REG.

In this specification, when the UE assumes that the same precoding is used for some REGs or a resource region, this may mean that the UE assumes that the same precoding is used for channels or signals transmitted in the REGs or resource region.

FIG. 5 illustrates overlapping of a CORESET and an SSB in a case where precoder granularity of the CORESET corresponds to all contiguous resource blocks. Even when the control channel is transmitted with the precoder granularity of the CORESET configured as all contiguous RBs, the CORESET may overlap with the SSB.

Referring to FIG. 5, when there is no transmission of SSB #0, the UE may assume that the same precoding is used in regions B, C, and D because regions B, C, and D of CORESET #1 are a set of contiguous RBs. However, when SSB #0 and CORESET #1 overlap with each other as shown in FIG. 5, the UE may receive a channel or a signal allocated to SSB #0 rather than control information allocated to CORESET #1 in region C. In this case, the UE may consider regions B and D as a set of contiguous RBs, thereby raising an issue regarding assumption of use of the same precoding.

Hereinafter, an operation to be performed when such an issue is raised is discussed.

When there is a symbol overlapping with the SSB among the resources in the CORESET, the UE may assume symbol-based puncturing in the CORESET. For example, as shown in FIG. 5, when a symbol to which regions B, C, and D belong overlaps with the SSB in the time domain, a region for the UE to decode is limited to region A of CORESET #1 of FIG. 5. Since region A is composed of a set of contiguous RBs, the UE may assume that the RS is present in all REGs in region A, and that the same precoding is used in all REGs in region A. In other words, a control channel and an RS may be received with the UE assuming that puncturing is performed on regions B, C, and D of CORESET #1, and that the same precoding is used in region A.

Alternatively, the UE may assume that puncturing is performed only on a resource region overlapping with the SSB in both the time/frequency domains among the CORESET resources. The UE may use QCL information included in the CORESET configuration in a resource region that overlaps with the SSB in the time domain and does not overlap therewith in the frequency domain.

For example, the UE assumes the same QCL (QCL included in the CORESET configuration) in regions A, B, and D shown in FIG. 5. When the QCL is assumed to be the same, the UE may perform monitoring/decoding of a control channel candidate in regions A, B, and D using the same Rx beam. The UE assumes that the RS (e.g., DMRS) is not transmitted in region C, that is, a resource region overlapping with the SSB in both the time and frequency domains. Regarding the precoding assumption, the UE may operate as described below.

The UE may assume that the same precoding is used in a region contiguous in one or more of the time and frequency domains to a resource region including a REG (or REG bundle) belonging to a control channel candidate to be monitored among regions A, B, and D of FIG. 5 in which puncturing is not assumed.

Since region A and region B include RBs contiguous in the time domain, the UE assumes the same precoding for the RBs belonging to region A and the RBs belonging to region B. Since region A and region D also include RBs contiguous in the time domain, the UE assumes the same precoding for the RBs belonging to region A and the RBs belonging to region D. In other words, region A and region B may be time-domain bundled, and region A and region D may be time-domain bundled.

Accordingly, the UE assumes the same precoding for the RBs belonging to region B and the RBs belonging to region D, including RBs non-contiguous to each other in the frequency domain.

However, since region B and region D are separated from each other in the frequency domain, channel estimation may be performed independently while the same precoding is assumed by the UE.

Alternatively, in the case of region B and region D of FIG. 5, it is considered that a non-contiguous interval (a gap, region C) is generated by SSB #0 in the frequency domain. Depending on the channel, region B and region D may not satisfy the coherent bandwidth. In consideration of this, the UE may assume the same precoding only when the two resource regions are a set of contiguous RBs within each symbol. For example, since region B and region D are discontiguous to each other in the frequency domain within the same symbol, the UE may not assume the same precoding the resource regions.

Alternatively, regardless of puncturing of any resource, the UE may assume precoding according to the CORESET configuration for all resource regions in the received CORESET.

Alternatively, the UE assumes that the RBs belonging to the CORESET are non-contiguous when any symbol of the resources in the CORESET is punctured. In this case, it may be assumed that a control channel is not mapped to an RB including the punctured symbol.

Alternatively, the UE assumes that after puncturing is performed on a resource in the CORESET, precoder granularity is configured as RBs that are contiguous even in one symbol among the remaining non-punctured resources. Even with this assumption, channel estimation for non-contiguous RBs is solved by implementation of the UE.

In the case where puncturing is performed on a certain resource and thus the control channel is not mapped to any symbols in the RB, the UE performs decoding on the assumption that an RB in which the control channel is not mapped to any symbol is not contiguous to an RB adjacent to the RB in which the control channel is not mapped to any symbol in the time or frequency domain.

Alternatively, when only resources overlapping with the SSB in both the time and frequency domains among the CORESET resources are punctured, the UE may be configured to conform to the QCL assumption of the SSB for the resources belonging to a region that overlaps with the SSB in the time domain, but not in the frequency domain.

For example, in FIG. 5, the UE uses the same QCL assumption for regions B, C, and D (QCL assumption for SSB #0). The UE does not assume the same QCL between region A and regions B, C, and D. In this case, the UE may not assume that the same precoding is used for region A and region B+D.

In addition, there is a possibility that region B and region D do not satisfy the coherent bandwidth as described above. In consideration of this, the UE may not assume that the same precoding is used for region B and region D. In addition, the UE may independently perform channel estimation for region B and region D.

In FIG. 5, the UE is illustrated s not assuming that the same precoding is used for region A and region B+D, which may mean that, even if region A and region B+D belonging to the same REG bundle or a set of contiguous RBs in the configuration of CORESET #1, puncturing is assumed to be performed in region C due to the overlap with the SSB, and then the UE should not assume that the same precoding is used for the regions.

5.2-1. Control Channel Mapping of CORESET when the Same Precoding is Assumed for Contiguous RBs The following is a description of puncturing or rate matching for a control channel, which may be assumed by the UE when the precoder granularity of a CORESET is configured as contiguous RBs.

The UE may assume that only an RE of the SSB that overlaps with the CORESET in the time and frequency domains are punctured or assume that rate matching is performed except for the RE.

Alternatively, in the case where the DMRS is mapped in the RE, the UE assumes that the REG to which the RE belongs is punctured/rate-matched.

Alternatively, when puncturing/rate matching occurs in at least one symbol among the resources in an RB, the UE assumes that all REGs of the entire CORESET duration are punctured/rate-matched.

Alternatively, when the CORESET overlaps with a rate matching resource, the UE assumes that the precoder granularity of the CORESET configured as contiguous RBs is not valid. In the CORESET that overlaps with the resource, a REG bundle configuration may be separately established, and the UE may perform a fallback operation assuming a REG bundle size according to the REG bundle configuration.

If the precoder granularity of the CORESET corresponds to all contiguous RBs, the REG bundle may not be needed. In this case, REG may form the basis of the interleaver design. The BS may proceed with REG-to-CCE mapping after performing rate matching. This means that the REG is not mapped to rate matching resources. The precoder may perform precoding according to this assumption.

If the precoder granularity of the CORESET corresponds to all contiguous RBs, the interleaver may perform interleaving for the CORESET, assuming that the REG bundle size matches the duration of the CORESET, or that the size is one of 6, 2, and 1.

The assumption that the REG bundle size matches the duration of the CORESET may be an assumption made when time-domain bundling is applied. The assumption of 6 may be an assumption made when bundling in the time and frequency domains is applied. The assumption of 2 may be an assumption made when frequency-domain bundling is applied. The assumption of 1 may be an assumption made when bundling is not applied.

Alternatively, the time-domain bundle may not be applied to the CORESET. A portion for which the UE assumes that the same precoding is used may be contiguous PRBs in symbols belonging to the same time domain.

The UE may not assume that the same precoding is used for symbols belonging to different time domains.

Alternatively, the UE may be configured to assume that the same precoding is used for symbols belonging to different time domains and to invalidate the assumption only in a specific case.

6. Overlap Between CORESETs

In the above, description has been given of the QCL assumption and precoding assumption for each region and the puncturing/rate matching operation configured in the case where the CORESET and the SSB overlap with each other. It has also been described that the operation described above may be used not only in the case where the CORESET and the SSB overlap with each other, but also in the case where CORESETs overlap with each other.

Hereinafter, further details about the operation that may be used when CORESETs overlap with each other will be discussed.

In the NR system, one or more CORESETs may be configured to configure a control channel. Each CORESET configuration may include presence or absence of interleaving, allocated time/frequency resources, and a transmission periodicity. Based on such CORESET configurations, REG and CCE indexing may be performed, and a search space may be configured.

Here, the periodicities of the CORESETs may be configured differently from each other. In this case, even though the allocated time/frequency resources differ between CORESETs, the CORESETs may be transmitted in an overlapping manner in a specific resource region according to the periodicities thereof. That is, in some cases, the UE may need to receive different CORESETs overlapping with each other in the same slot.

When a plurality of CORESETs conforming to different configurations overlap with each other, resources of a specific CORESET may block resources of another CORESET.

FIG. 6 illustrates a case where blocking occurs due to overlapping between different CORESETs.

In FIG. 6, CORESET 0 is configured in 1 symbol in the time domain (duration=1). Interleaving of a REG bundle level is applied to CORESET 0. In this case, the REG bundle size is assumed to be 2. CORESET 1 is configured over 3 symbols (duration=3) in the time domain. It is assumed that interleaving is not applied to CORESET 1. In FIG. 6, the number marked on each REG represents a CCE index.

As shown in FIG. 6, when control information is transmitted in CCEs 3 to 5 of CORESET 0, control information may not be transmitted either in directly blocked resources or all resources using CCEs 0, 1, and 2 in CORESET 1.

If control information is transmitted in CORESET 0 by aggregating CCEs 0 to 5 at aggregation level 6, CORESET 1 may not have available resources in a slot in which CORESET 1 overlaps with CORESET 0. Some resources overlapping with CORESET 0 cause the resources included in all CCEs of CORESET 1 to be unavailable.

As such, blocking may reduce the resources available within each CORESET. In addition, the UE may perform blind decoding without recognizing that a resource is already blocked and may not acquire any information. Unnecessary operation of the UE leads to waste of power.

Hereinafter, a method for reducing damage due to such blocking between CORESETs will be discussed. In addition, as described above, even when CORESETs overlap with each other, different TCI states or QCL assumptions may be configured for the respective CORESETs, similar to the case where a CORESET and an SSB overlap with each other. Considering this case, priorities may be defined between the CORESETs for the QCL assumption for the overlapped region.

6.1. Search Space Configuration

Methods described below may be used for blocking and Rx beam configuration. The methods described below may be implemented alone or in combination.

To use the methods described below, a network or BS specifies priorities for CORESETs. For example, the network or the BS may configure CORESET 0 and CORESET 1 and specify a higher priority for CORESET 0.

Once the priorities of the CORESETs are configured, the UE may apply the methods described below to CORESET 1 having a lower priority.

Even when three or more CORESETs are configured, a priority may be specified for each CORESET. For example, suppose that a CORESET for a group common PDCCH (hereinafter, a group common CORESET) is configured, and two CORESETs for a UE-specific PDCCH (hereinafter, UE-specific CORESETs) are configured.

In this case, the network or the BS may configure a higher priority for the group common CORESET, which is monitored by a plurality of UEs, than the UE-specific CORESETs and configure priorities for the UE specific CORESETs.

Hereinafter, for simplicity, it is assumed that the priority of CORESET 0 is higher than that of CORESET 1 in the case where the two CORESETs overlap with each other.

One or more of the methods described below may be applied to the UE at the same time. To this end, the BS may transmit a physical layer signal/a higher layer signal to the UE. While the following description is based on CCE indexing, the present disclosure may be applied even to REG indexing, candidate indexing and the like.

Additionally, the network or the BS may indicate, through the physical layer signal/high layer signal, information about the resources to which the following methods are applied. For example, when overlap between CORESETs occurs in every subframe, the network or the BS may specify a periodicity of application of the following methods such that the following methods are applied in every period.

6.1.1. Blind Decoding (BD) Skipping

When all or part of the control channel candidates on which BD is to be performed in CORESET 1 overlap with CORESET 0, the UE may not perform BD on the corresponding control channel candidates. This method may be useful in reducing the complexity of the UE when the overlapped region is relatively narrow.

For example, when resources overlap with each other as shown in FIG. 7(a), the UE may skip BD for a control channel candidate including CCEs 0 to 5 among the control channel candidates of CORESET 1. When different CORESETs overlap with each other, the UE may monitor CORESET 0 assigned the high priority according to the configuration of CORESET 0 and skip decoding of a control channel candidate including the overlapping resources in the low priority CORESET.

However, this method may cause waste of resources depending on the overlapped region. In the case of FIG. 7(b), all control channel candidates of CORESET 1 overlap CORESET 0, and therefore the UE may not perform BD on the entirety of CORESET 1.

In consideration of this, in the case of FIG. 7(b), the UE may assume that the resources belonging to the overlapped region are punctured. Alternatively, the UE may assume that rate matching is performed except for the resources belonging to the overlapped region. In this case, the actual coding gain for each control channel candidate may be reduced, but waste of resources may be reduced.

The operation of skipping BD in a section where CORESETs overlap with each other or assuming puncturing/rate matching for overlapping resources may be pre-defined in the UE. Alternatively, an instruction to operate as described above may be received from the network or the BS through a higher layer signal (e.g., a CORESET configuration).

Additionally, a CORESET in which puncturing or rate matching may be assumed to be performed may be pre-defined in advance. For example, the UE may assume that puncturing is applied to a CORESET to which time-first mapping is applied, or that puncturing is applied to a CORESET on which interleaving is performed at the REG bundle level.

As another method, it may be predefined in the UE that BD skipping is applied to a resource unit (e.g., CCE, candidate) including a predetermined proportion (e.g., 50%) of resources or more in an overlapped region.

In addition, BD skipping may be used not only for overlap between CORESETs but also for collision between a CORESET and an SSB. For example, when a CORESET overlaps with an SSB, the UE may skip monitoring of the control channel candidate of a CORESET included in the overlapped region.

6.1.2. No Resource Indexing on Overlapped Resource

In order to attenuate increase of a coding rate for a control channel candidate and unnecessary waste of resources, a BS may transmit a CORESET without performing resource indexing on an overlapped resource region.

Here, the resource indexing may include indexing of one or more of a REG, a CCE, and a control channel candidate.

A region where resource indexing is not performed may be limited only to a region where overlap between CORESETs occurs. Alternatively, when the overlapped resource region is larger or smaller than a multiple of a specific resource unit, indexing may not be performed even on the resource region where the overlapping has not occurred.

Specifically, when resources in the entire frequency domain of a specific symbol in a CORESET overlap with another CORESET or most resources in the specific symbol overlap with another CORESET, all resources of the specific symbol in the CORESET are excluded from resource indexing. The duration of the CORESET may vary depending on occurrence of overlap.

The UE may receive information related to resource indexing. Alternatively, there may be a configuration related to resource indexing in the UE. In this case, the UE may monitor a channel or signal without performing resource indexing on at least one of the REG, CCE, or control channel candidate in which overlap between CORESETs has occurred in the search space.

FIG. 8 illustrates an example in which resource indexing is not performed on an overlapped resource region. Although FIG. 8 illustrates CCE indexing, the present disclosure may be applied to indexing of REGs and control channel candidates corresponding to each CCE.

FIG. 8(b) illustrates an example in which CCE indexing is not performed in an overlapped resource region and time-first indexing is applied in a non-overlapped resource region according to an example of the present disclosure. FIG. 8(c) illustrates an example in which CCE indexing is not performed in an overlapped resource region and frequency-first mapping is applied in a non-overlapped resource region according to an example of the present disclosure.

When all the specific symbols of the CORESET 1 overlap with CORESET 0 as shown in FIG. 8, whether to perform indexing is determined at the symbol level, and accordingly the UE may change only the duration in the configuration for CORESET 1 to receive, monitor or decode a control channel. If there is a CORESET configured in 1 symbol and the symbol overlaps with another CORESET having a higher priority, or if "no resource indexing" is indicated for the 1 symbol CORESET by the network/BS, the UE may skip BD for the 1 symbol CORESET in a subframe or slot in which overlap occurs.

FIG. 9 illustrates an exemplary case where overlap between CORESETs occurs only in a part of the first symbol of CORESET 1. In this case, CCE indexing may not be performed either in the overlapped region of CORESET 1 or in part of the non-overlapped region. Alternatively, CCE indexing may not be performed on the entirety of a symbol to which the overlapped resource region belongs.

When CCE-to-REG mapping of CORESET 1 is frequency-first mapping and the non-overlapped region is not a multiple of the CCE or REG bundle size (in the frequency domain), it may be difficult to perform UE-dedicated beamforming or REG bundling.

In this case, resource indexing may not be performed even in the non-overlapped region by a pre-definition or by a network/BS. For example, in FIG. 9(a), when the number of non-overlapped REGs is 1 to 5 or a value obtained by modulo operation of the number of REGs of the non-overlapped region with 6 is 1 to 5, CCE indexing may be predefined so as not to be performed in the region.

FIG. 9(b) illustrates a case where time-first indexing is applied to CORESET 1. In FIG. 9, the number of REGs is a multiple of 6 in a region where the number of available symbols is 2, which are generated as resource indexing is not performed. For example, in FIG. 9(b), a region having CCE indexes 0 to 3 corresponds to a region where the number of available symbols is 2. When the number of REGs is a multiple of 6, there is no case where one CCE is distributed in regions having different numbers of available symbols.

For example, in FIG. 9(b), the region where the CCE index is 3 and the region where the CCE index is 4 correspond to regions having a different number of available symbols from the region where the CCE indexes are 0 to 3.

However, when the number of available REGs is not a multiple of 6 in a region having the same number of symbols, or when interleaving is performed at the REG (bundle) level and REGs constituting one CCE are distributed in regions having different numbers of symbols, CCEs may be configured irregularly. In this case, performance of a transmission scheme (e.g., UE-dedicated beamforming/transmit diversity) may be affected.

Hereinafter, a method of preventing an irregular CCE configuration when one or more of time-first mapping and interleaving are performed on CORESET 1 is proposed.

6.1.3. CORESET Decomposition

Hereinafter, as a method of preventing an irregular CCE configuration, decomposition of CORESET 1 is proposed.

According to CORESET decomposition, when there is a CORESET in which resource indexing is not performed due to the overlap, a subCORESET based on the overlapping interval is configured. In each subCORESET, resource indexing may be performed independently. The number of control channel candidates allocated to the decomposed CORESET may be distributed to each subCORESET based on the resource size (e.g., REG number, CCE number) and the like.

FIG. 10 illustrates an exemplary case where CORESET 0 and CORESET 1 partially overlap with each other and resource indexing for CORESET 1 is not performed in the overlapped region.

As shown in FIG. 10, resource indexing may be performed after CORESET 1 is decomposed into two sub-CORESETs (CORESET 1-1 and CORESET 1-2) for which different durations are configured. A subCORESET pattern may be predefined or signaled to the UE by the network/BS. The configuration of CORESET 1 before the decomposition may be applied to each subCORESET. However, the duration or REG bundle size of each subCORESET may be changed by decomposition, and thus be different from the configuration of CORESET 1 before the decomposition.

For example, it is assumed in FIG. 10 that CORESET 1 is configured as duration=3, CCE-to-REG mapping with interleaving, and REG bundle size=CORESET duration, or the UE receives the configuration.

In this case, configuration of subCORESETs decomposed as shown in FIG. 10(a) may be established in a resource region overlapping with CORESET 0 as follows. For CORESET 1-1, CORESET duration=1, CCE-to-REG mapping with interleaving, and REG bundle size=2 may be configured. For CORESET 1-2, CORESET duration=3, CCE-to-REG mapping with interleaving, and REG bundle size=3 may be configured.

Alternatively, when multiple REG bundle sizes are allowed to be configured for the respective subCORESETs, the REG bundle sizes for the respective subCORESETs may be predefined in the UE or signaled to the UE by the network/BS.

As another method, the configuration for each subCORESET may be included in the base CORESET configuration of CORESET 1 given before the decomposition. For example, the network/BS may include each subCORESET configuration in CORESET 1 in consideration of the form of each subCORESET. A CCE-to-REG mapping scheme may be included in each subCORESET configuration.

The CCE-to-REG mapping scheme of each subCORESET may be configured differently according to the resource pattern of each subCORESET. The resource pattern of a subCORSET may include a subCORESET duration.

The network/BS may flexibly adjust the configurations for the respective subCORESET. However, since a plurality of configurations for each subCORESET is added to the configuration of CORESET 1 considering decomposition, unnecessary signaling overhead may occur.

6.2. Reserved Resource

In the above discussion, an operation of changing a resource indexing scheme or skipping BD to reduce damage due to blocking when overlapping between different CORESETs configured in the UE occurs has been proposed.

In this situation, a group common PDCCH for each UE group may be used in the NR system. When a specific UE belongs to group A, a CORESET for the group common PDCCH for group B may not be signaled to UEs belonging to group A.

In this case, a CORESET for a group common PDCCH for the UEs belonging to group A to monitor (hereinafter, CORESET A) may overlap with a CORESET for a group common PDCCH for group B group (hereinafter, CORESET B).

In the present disclosure, in order to reduce damages caused by blocking that occurs in this case, it is proposed that the network/BS signal to the UE whether some of the resources belonging to CORESET A are reserved. This information may be included in the configuration for CORESET A.

For example, when the monitoring periodicity of CORESET A is set to 2 m, the network/BS may configure a specific resource region (e.g., a combination of REGs, CCEs, candidates, PRBs, symbols, etc.) in CORESET A as a reserved resource having a periodicity of 10 ms. In this case, CORESET B may be transmitted with a periodicity of 10 ms in a region overlapping with the specific resource region in CORESET A.

When the UE receives signaling of the reserved resource, the UE may perform one or more of BD skipping, resource indexing, and CORESET decomposition described above on the reserved resource.

6.3. Transmit Diversity Schemes for Control Channel

The network/BS may communicate with the UE by operating multiple beams. In this case, the network/BS may use a transmit diversity scheme that is based on multiple analog beams and/or digital beams.

Hereinafter, a transmission (Tx) beam may refer to an analog beam. A digital beam may refer to a narrow beam that is narrower than a specific analog beam and may be implemented through precoding within the specific analog beam.

In the case of analog beams, an optimal reception analog beam may be configured differently for each Tx analog beam. On the other hand, a digital beam may be distinguished by precoding or the like within a specific transmission/reception analog beam pair, and therefore the same reception analog beam may be applied to different digital beams.

Hereinafter, a transmit diversity scheme based on multiple analog beams is proposed, and a transmit diversity scheme based on a digital beam may be additionally applied for each analog beam.

6.3.1. Repetition Based on Multiple Layers

Here, the multiple layers refer to layers divided in the spatial domain by an analog beam. This scheme may be applied when the network/BS transmits multiple Tx beams simultaneously.

Hereinafter, a case where 2 Tx beams are used will be described, but the present disclosure may be applied even when three or more Tx beams are used.

The UE may report to the network a Tx beam set that may be received using the same Rx beam. In this case, the network/BS may transmit a control channel using some or all of the corresponding beams. The network/BS may transmit the same control information on the same time/frequency resource using different Tx beams. Signals including control information, transmitted by different Tx beams, may be superposed and received by the UE. This means that a transmit diversity scheme based on different spatial resources may be used.

When this scheme is applied, a transmit diversity gain may be expected without additional signaling or procedure. In addition, different RS ports may be configured for the respective layers for better performance. In this case, a loss in channel estimation that may occur due to superposition may be reduced, but channel estimation complexity may increase.

In consideration of this, the network/BS informs the UE, through a CORESET configuration, that control information to be transmitted in the CORESET is transmitted using multiple layers, and that the layers may be estimated by different RS ports, respectively.

However, since the data part is repeated, summation may be applied to the coded bit level after channel estimation, and accordingly decoding complexity may not greatly increase. In addition, since repetition of data is applied, the UE may assume that resource mapping of each layer is the same.

Additionally, when spatial multiplexing between Tx beams is performed, a scheme of lowering a coding rate may be used. However, since decoding for each layer should be performed separately, receiving complexity may increase compared to data repetition.

6.3.2. Tx Beam Cycling in Frequency Domain

Beam cycling based on an analog beam may be used when a network/BS is allowed to use multiple Tx beams simultaneously. Similar to repetition using multiple layers, the UE may report to the network/BS a Tx beam set that may be received with the same Rx beam. The network/BS may obtain a transmit diversity gain by using different Tx beams for respective REG bundles in the frequency domain based on the corresponding Tx beams. In this case, the UE may implement the reception operation using only one RS port.

In addition, beam cycling based on an analog beam may be implemented in the time domain. For example, when symbols #a and #b are present in a CORESET, different Tx beams may be mapped to symbols #a and #b. In this case, the restriction of a Tx beam set that may be received with one Rx beam as assumed above may not be applied.

That is, since the UE may use different Rx beams for the respective symbols, beam cycling based on various Rx beams may be performed compared to the beam cycling in the frequency domain. However, the network/BS may need to inform the UE of information related to the Rx beams that the UE should use for the respective symbols.

In the above, a transmit diversity scheme based on multiple Tx beams that may be received by the UE using one Rx beam has been proposed. With the proposed scheme, a transmit diversity scheme based on an analog beam may be implemented without additional signaling, but Tx beam selection by the BS may be restricted.

In the case where the UE is allowed to use multiple Rx beams at the same time, restrictions on the Tx beam selection may be reduced. That is, the same data may be repeatedly transmitted through multiple Tx/Rx beam combinations. This operation may be applied to all the transmit diversity schemes described above. In this case, the network/BS needs to inform the UE of each Tx/Rx beam combination.

For example, the network/BS may repeatedly transmit a specific CORESET using multiple layers. In addition, the network/BS may indicate (spatial) QCL information about each layer to the UE through the CORESET configuration or the like. Here, the QCL information may be a configuration for a Tx beam used for each layer or an Rx beam that the UE should use for each layer. When frequency-division multiplexing (FDM) is used between Tx beams, different QCL information may be indicated for each frequency region in which each Tx beam is applied.

6.3.3. CORESET Configuration for Multiple Beam Operation

In the NR system, a CORESET may represent a resource region for configuring a search space for a control channel, and CCE-to-REG mapping, RS configuration, a transmission scheme, resource unit configuration, a control information type, and the like may be configured differently for each CORESET. Here, the resource unit configuration may include one or more of an aggregation level, the number of candidate candidates, or a duration.

As described above, when transmission and reception of a control channel is performed using multiple beams for the purpose of improving the performance of the control channel and expanding the transmission opportunity, a beam-related configuration may be included in the CORESET configuration.

Hereinafter, it is proposed that beam-related information that is or may be used in a corresponding CORESET be included in the CORESET configuration in consideration of a multi-beam operation. Specifically, the beam-related information may be configured as follows.

Spatial-division multiplexing (SDM), time-division multiplexing (TDM), and frequency-division multiplexing (FDM) between Tx beams proposed above may obtain a gain in different environments according to the capability of a UE, a channel condition, and the like. The capability of the UE may include the number of Rx beams that may be used simultaneously.

The network/BS may configure a scheme of multiplexing between beams for a CORESET in which the multi-beam operation is performed. When SDM is used, whether to use the above-described data repetition may be signaled from the BS to the UE.

For example, in the case of SDM, information (e.g., RS port, scrambling parameter) for distinguishing between the Tx beams may be configured for each CORESET.

In the case of TDM or FDM, Tx beam information in the time or frequency domain may be configured for each CORESET.

When TDM is used, the UE may assume that, for a CORESET for which a duration of 3 symbols is configured, Tx beam #1 is used in the first symbol and Tx beam #2 is used in the second and third symbols.

In order to use multiple Tx beams, when a UE uses multiple RS ports, the network/BS may perform RS configuration for each beam through a CORESET configuration or the like. For example, the number of RS ports used in the corresponding CORESET, and an RS port index, an RS pattern, an RS scrambling parameter, and the like that the UE should use may be configured for each CORESET.

As described above, when the UE performs a reception operation using multiple Rx beams, the network/BS may configure Rx beam information to be used in the corresponding CORESET through the CORESET configuration. For example, when the Tx beams are mapped to different layers, the BS may signal Rx beam information that the UE should assume for each layer. For example, the network/BS may include information about one or more of a Tx beam, a CSI-RS port, and an Rx beam that may be used for each layer in the CORESET configuration.

FIG. 11 is a conceptual diagram of uplink data transmission according to examples of the present disclosure.

Referring to FIG. 11, examples of the present disclosure may include one or more of receiving a configuration for a control resource set (S1101), monitoring a control channel candidate within the control resource set (S1103), or performing demodulation of the control channel candidate (S1105).

The configuration for the control resource set may include information about precoder granularity.

In addition, based on the information about the precoder granularity, the UE may determine resource element groups (REGs) for which the same precoding is assumed to be used among the REGs included in the control resource set, and monitor the control channel candidate.

In addition, regarding REGs in which the UE assumes that the same precoding is used, when the information about the precoder granularity corresponds to a first configuration, the UE may assume that the same precoding is used for the REGs included in contiguous RBs in the control resource set.

In this case, as described with reference to FIG. 5, when some of the contiguous RBs overlap with another resource region and specific RBs in the contiguous RBs are no longer contiguous to each other due to the overlapping, the UE may assume that the same precoding is used for the REGs included in the specific RBs even if the information about the precoder granularity is related to the first configuration.

The other overlapped resource region may be a resource region allocated to a synchronization signal block or another control resource set.

When the synchronization signal block overlaps with the control channel, the UE may skip monitoring of a control channel candidate including an RB belonging to the overlapped region.

In monitoring the control channel candidate, the UE may assume the same Quasi Co-Located (QCL) for the REGs included in specific RBs that are discontiguous to each other. Information about the QCL may be included in the configuration for the control resource set.

In demodulating the control channel candidate, when the information about the precoder granularity is related to the first configuration, the UE may assume that demodulation reference signals (DMRSs) for the control channel candidate are mapped to all REGs included in the contiguous RBs. However, the UE may assume that the DMRSs for the control channel candidate are not mapped to the REGs included in the RBs belonging to the overlapped region.

In addition, when the UE performs channel estimation to demodulate the control channel candidate, the UE may assume that the same precoding is used for the mapped DMRSs.

The UE may demodulate the control channel candidate depending on the result of channel estimation.

In channel estimation, the UE may perform channel estimations independent of each other while assuming the same precoding for each of a first RB and a second RB that are discontiguous to each other.

When a control resource set overlaps with a control channel included in another control resource set, the UE may monitor a control channel candidate based on the priorities of the control resource sets.

When the priority of a first control resource set is higher than that of a second control resource set, the UE may skip monitoring of the control channel candidate including the RB belonging to the overlapped region, or perform resource indexing of the control resource set except for the control channel candidate including the RB belonging to the overlapped region.

In addition, when resource indexing of the control resource set is performed except for the control channel candidate including the RB belonging to the overlapped region, the control resource set may be divided into multiple control resource subsets.

The configuration for each of the multiple sub-control resource sets may be determined separately from the configuration for the control resource set due to the overlapped region.

7. Device Configuration

FIG. 12 is a block diagram showing a structure of a base station (BS) 105 and a UE 110 in a wireless communication system 100 according to an example of the present disclosure. The structure of the BS 105 and the UE 110 of FIG. 4 are merely an example of a BS and a UE for implementing the aforementioned method and the structure of a BS and a UE according to the present disclosure is not limited to FIG. 4. The BS 105 may also be referred to as an eNB or a gNB. The UE 110 may also be referred to as a user terminal.

Although one BS 105 and one UE 110 are illustrated for simplifying the wireless communication system 100, the wireless communication system 100 may include one or more BSs and/or one or more UEs.

The BS 105 may include a transmission (Tx) data processor 115, a symbol modulator 120, a transmitter 125, a transmission/reception antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmission/reception antenna 135, a processor 155, a memory 160, a receiver 140, a symbol demodulator 155, and an Rx data processor 150. In FIG. 12, although one antenna 130 is used for the BS 105 and one antenna 135 is used for the UE 110, each of the BS 105 and the UE 110 may also include a plurality of antennas as necessary. Therefore, the BS 105 and the UE 110 according to the present disclosure support a Multiple Input Multiple Output (MIMO) system. The BS 105 according to the present disclosure may support both a Single User-MIMO (SU-MIMO) scheme and a Multi User-MIMO (MU-MIMO) scheme.

In downlink, the Tx data processor 115 receives traffic data, formats the received traffic data, codes the formatted traffic data, interleaves the coded traffic data, and modulates the interleaved data (or performs symbol mapping upon the interleaved data), such that it provides modulation symbols (i.e., data symbols). The symbol modulator 120 receives and processes the data symbols and pilot symbols, such that it provides a stream of symbols.

The symbol modulator 120 multiplexes data and pilot symbols, and transmits the multiplexed data and pilot symbols to the transmitter 125. In this case, each transmission (Tx) symbol may be a data symbol, a pilot symbol, or a value of a zero signal (null signal). In each symbol period, pilot symbols may be successively transmitted during each symbol period. The pilot symbols may be an FDM symbol, an OFDM symbol, a Time Division Multiplexing (TDM) symbol, or a Code Division Multiplexing (CDM) symbol.

The transmitter 125 receives a stream of symbols, converts the received symbols into one or more analog signals, and additionally adjusts the one or more analog signals (e.g., amplification, filtering, and frequency upconversion of the analog signals), such that it generates a downlink signal appropriate for data transmission through an RF channel. Subsequently, the downlink signal is transmitted to the UE through the antenna 130.

Configuration of the UE 110 will hereinafter be described in detail. The antenna 135 of the UE 110 receives a DL signal from the BS 105, and transmits the DL signal to the receiver 140. The receiver 140 performs adjustment (e.g., filtering, amplification, and frequency downconversion) of the received DL signal, and digitizes the adjusted signal to obtain samples. The symbol demodulator 145 demodulates the received pilot symbols, and provides the demodulated result to the processor 155 to perform channel estimation.

The symbol demodulator 145 receives a frequency response estimation value for downlink from the processor 155, demodulates the received data symbols, obtains data symbol estimation values (indicating estimation values of the transmitted data symbols), and provides the data symbol estimation values to the Rx data processor 150. The Rx data processor 150 performs demodulation (i.e., symbol-demapping) of data symbol estimation values, deinterleaves the demodulated result, decodes the deinterleaved result, and recovers the transmitted traffic data.

The processing of the symbol demodulator 145 and the Rx data processor 150 is complementary to that of the symbol modulator 120 and the Tx data processor 115 in the BS 205.

The Tx data processor 165 of the UE 110 processes traffic data in uplink, and provides data symbols. The symbol modulator 170 receives and multiplexes data symbols, and modulates the multiplexed data symbols, such that it may provide a stream of symbols to the transmitter 175. The transmitter 175 obtains and processes the stream of symbols to generate an uplink (UL) signal, and the UL signal is transmitted to the BS 105 through the antenna 135. The transmitter and the receiver of UE/BS may be implemented as a single radio frequency (RF) unit.

The BS 105 receives the UL signal from the UE 110 through the antenna 130. The receiver processes the received UL signal to obtain samples. Subsequently, the symbol demodulator 195 processes the symbols, and provides pilot symbols and data symbol estimation values received via uplink. The Rx data processor 197 processes the data symbol estimation value, and recovers traffic data received from the UE 110.

A processor 155 or 180 of the UE 110 or the BS 105 commands or indicates operations of the UE 110 or the BS 105. For example, the processor 155 or 180 of the UE 110 or the BS 105 controls, adjusts, and manages operations of the UE 210 or the BS 105. Each processor 155 or 180 may be connected to a memory unit 160 or 185 for storing program code and data. The memory 160 or 185 is connected to the processor 155 or 180, such that it may store the operating system, applications, and general files.

The processor 155 or 180 may also be referred to as a controller, a microcontroller), a microprocessor, a microcomputer, etc. In the meantime, the processor 155 or 180 may be implemented by various means, for example, hardware, firmware, software, or a combination thereof. In a hardware configuration, methods according to the examples of the present disclosure may be implemented by the processor 155 or 180, for example, one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, methods according to the examples of the present disclosure may be implemented in the form of modules, procedures, functions, etc. which perform the above-described functions or operations. Firmware or software implemented in the present disclosure may be contained in the processor 155 or 180 or the memory unit 160 or 185, such that it may be driven by the processor 155 or 180.

Radio interface protocol layers among the UE 110, the BS 105, and a wireless communication system (i.e., network) may be classified into a first layer (L1 layer), a second layer (L2 layer) and a third layer (L3 layer) on the basis of the lower three layers of the Open System Interconnection (OSI) reference model widely known in communication systems. A physical layer belonging to the first layer (L1) provides an information transfer service through a physical channel. A Radio Resource Control (RRC) layer belonging to the third layer (L3) controls radio resources between the UE and the network. The UE 110 and the BS 105 may exchange RRC messages with each other through the wireless communication network and the RRC layer.

The above-mentioned examples correspond to combinations of elements and features of the present disclosure in prescribed forms. And, it is able to consider that the respective elements or features are selective unless they are explicitly mentioned. Each of the elements or features may be implemented in a form failing to be combined with other elements or features. Moreover, it is able to implement an example of the present disclosure by combining elements and/or features together in part. A sequence of operations explained for each example of the present disclosure may be modified. Some configurations or features of one example may be included in another example or may be substituted for corresponding configurations or features of another example. And, it is apparently understandable that an example is configured by combining claims failing to have relation of explicit citation in the appended claims together or may be included as new claims by amendment after filing an application.

While the present disclosure has been described and illustrated herein with reference to the preferred examples thereof, it will be apparent to those skilled in the art that various modifications and variations may be made therein without departing from the spirit and scope of the disclosure. Thus, it is intended that the present disclosure covers the modifications and variations of this disclosure that come within the scope of the appended claims and their equivalents.

INDUSTRIAL APPLICABILITY

The present disclosure is applicable to various wireless access systems.

The invention claimed is:

1. A method of receiving a signal by a user equipment (UE) in a wireless communication system, the method comprising:
   receiving a first configuration including information about precoder granularity for a control resource set; and
   monitoring control channel candidates based on resource element groups (REGs),
   wherein, based on the information about the precoder granularity being related to a second configuration, the same precoding is used for the REGs included in contiguous resource blocks of the control resource set,
   wherein, based on some of the contiguous resource blocks of a first control resource set overlapping with a resource region allocated to a second control resource set, the control resource set for the monitoring of the control channel candidates is determined based on a priority of the first control resource set and a priority of the second control resource set, and
   wherein the priority of the first control resource set is determined to be higher than the priority of the second control resource set based on the first control resource set corresponding to a common search space (CSS) and the second control resource set corresponding to a UE-specific search space (USS).

2. The method of claim 1, wherein, based on the information about the precoder granularity being related to the second configuration, the UE assumes that demodulation reference signals (DM RSs) for the control channel candidates are mapped to all the REGs included in the contiguous resource blocks, and
   wherein the UE assumes that the DM RSs for the control channel candidates are not mapped to a REG included in the some of the contiguous resource blocks overlapping with the other resource region.

3. The method of claim 2, wherein the UE performs channel estimation, assuming that the same precoding is used for the mapped DMRSs, and
   performs demodulation of the control channel candidates according to a result of the channel estimation.

4. The method of claim 1, wherein the UE skips monitoring of a control channel candidate in the second control resource set based on the priority of the first control resource set and the priority of the second control resource set.

5. The method of claim 1, wherein the priority of the first control resource set is determined to be higher than the priority of the second control resource set based on the first control resource set having a lower index than the second control resource set.

6. A user equipment (UE) for receiving a signal in a wireless communication system, comprising:
   a transceiver; and
   a processor configured to control the transceiver,
   wherein the processor is configured to:
   control the transceiver to receive a first configuration for a control resource set, the information including information about precoder granularity; and
   monitor control channel candidates based on resource element groups (REGs),
   wherein, based on the information about the precoder granularity being related to a second configuration, the same precoding is used for the REGs included in contiguous resource blocks of the control resource set,
   wherein, based on some of the contiguous resource blocks of a first control resource set overlapping with other resource region allocated to a second control resource set, the control resource set for the monitoring of the control channel candidates is determined based on a priority of the first control resource set and a priority of the second control resource set, and
   wherein the priority of the first control resource set is determined to be higher than the priority of the second control resource set based on the first control resource set corresponding to a common search space (CSS) and based on the second control resource set corresponding to a UE-specific search space (USS).

7. The UE of claim 6, wherein, based on the information about the precoder granularity being related to the second configuration, the processor assumes that demodulation reference signals (DM RSs) for the control channel candidates are mapped to all the REGs included in the contiguous resource blocks, and wherein the processor assumes that the DM RSs for the control channel candidates are not mapped to a REG included in the some of the contiguous resource blocks overlapping with the other resource region.

8. The UE of claim 7, wherein the processor performs channel estimation, assuming that the same precoding is used for the mapped DM RSs, and performs demodulation of the control channel candidates according to a result of the channel estimation.

9. The UE of claim 6, wherein the processor skips monitoring of a control channel candidate in the second control resource set based on the priority of the first control resource set and the priority of the second control resource set.

10. The UE according to claim 6, wherein the priority of the first control resource set is determined to be higher than the priority of the second control resource set based on the first control resource set having a lower index than the second control resource set.

* * * * *